(12) United States Patent
Lin

(10) Patent No.: US 6,617,530 B1
(45) Date of Patent: Sep. 9, 2003

(54) SCALE WITH USE REMINDER AND WEIGHT CHANGE MESSAGES

(76) Inventor: Li Lin, 910 W. 50$^{th}$ Pl., Chicago, IL (US) 60609

( * ) Notice: Subject to any disclaimer, the term of this patent is extended or adjusted under 35 U.S.C. 154(b) by 0 days.

(21) Appl. No.: 09/961,968

(22) Filed: Sep. 24, 2001

(51) Int. Cl.$^7$ .............................................. G01G 19/40
(52) U.S. Cl. ............................... 177/25.16; 177/25.19; 177/45; 128/921; 368/10
(58) Field of Search ........................... 177/25.16, 25.19, 177/45–49; 128/921; 368/10

(56) References Cited

U.S. PATENT DOCUMENTS

| | | | | |
|---|---|---|---|---|
| 4,100,401 A | * | 7/1978 | Tutt et al. ...................... | 368/10 |
| 4,366,873 A | * | 1/1983 | Levy et al. ............... | 177/25.19 |
| 4,576,244 A | * | 3/1986 | Zeigner et al. ................ | 177/45 |
| 4,853,854 A | * | 8/1989 | Behar et al. ................... | 368/10 |
| 5,805,051 A | * | 9/1998 | Herrmann et al. ............ | 368/10 |

* cited by examiner

Primary Examiner—Randy Gibson
(74) Attorney, Agent, or Firm—Goldstein & Lavas, P.C.

(57) ABSTRACT

A scale with use reminder and weight change messages including a scale portion capable of accurately determining a weight of a person standing thereon. The scale portion includes a display for registering the weight of the person standing thereon. A central processing unit is disposed interiorly of the scale portion. The central processing unit is capable of storing the weight of the person standing on the scale portion on a first day and comparing it with the weight of the person standing on the scale portion on a next day and illustrating both on the display along with a difference between the two. The central processing unit includes programmed messages.

5 Claims, 2 Drawing Sheets

SCALE WITH USE REMINDER AND WEIGHT CHANGE MESSAGES

BACKGROUND OF THE INVENTION

The present invention relates to a scale with use reminder and weight change messages and more particularly pertains to reminding a user to weigh themselves daily at a predetermined time and offer congratulatory comments upon weight loss and offer encouragement upon weight gain.

The use of scales and weighing devices is known in the prior art. More specifically, scales and weighing devices heretofore devised and utilized for the purpose of weighing individuals and objects are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, these patents do not describe a scale with use reminder and weight change messages for reminding a user to weigh themselves daily at a predetermined time and offer congratulatory comments upon weight loss and offer encouragement upon weight gain.

In this respect, the scale with use reminder and weight change messages according to the present invention substantially departs from the conventional concepts and designs of the prior art, and in doing so provides an apparatus primarily developed for the purpose of reminding a user to weigh themselves daily at a predetermined time and offer congratulatory comments upon weight loss and offer encouragement upon weight gain.

Therefore, it can be appreciated that there exists a continuing need for a new and improved scale with use reminder and weight change messages which can be used for reminding a user to weigh themselves daily at a predetermined time and offer congratulatory comments upon weight loss and offer encouragement upon weight gain. In this regard, the present invention substantially fulfills this need.

SUMMARY OF THE INVENTION

In the view of the foregoing disadvantages inherent in the known types of scales and weighing devices now present in the prior art, the present invention provides an improved scale with use reminder and weight change messages. As such, the general purpose of the present invention, which will be described subsequently in greater detail, is to provide a new and improved scale with use reminder and weight change messages which has all the advantages of the prior art and none of the disadvantages.

To attain this, the present invention essentially comprises a scale portion capable of accurately determining a weight of a person standing thereon. The scale portion includes a display for registering the weight of the person standing thereon. A central processing unit is disposed interiorly of the scale portion. The central processing unit is capable of storing the weight of the person standing on the scale portion on a first day and comparing it with the weight of the person standing on the scale portion on a next day and illustrating both on the display along with a difference between the two. The central processing unit includes programmed messages. The programmed messages include congratulatory messages when the weight of the person on the next day is less than the weight of the person of the first day and encouraging messages when the weight of the person on the next day is greater than the weight of the person of the first day. The central processing unit includes a speaker for broadcasting the programmed messages. The speaker includes a volume control dial. A programmable alarm is disposed within the scale portion. The programmable alarm has a time-activated alarm in communication with the speaker of the central processing unit. The programmable alarm includes a control panel to input a desired time for the time-activated alarm to be activated.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved scale with use reminder and weight change messages which has all the advantages of the prior art scales and weighing devices and none of the disadvantages.

It is another object of the present invention to provide a new and improved scale with use reminder and weight change messages which may be easily and efficiently manufactured and marketed.

It is a further object of the present invention to provide a new and improved scale with use reminder and weight change messages which is of durable and reliable construction.

An even further object of the present invention is to provide a new and improved scale with use reminder and weight change messages which is susceptible of a low cost of manufacture with regard to both materials and labor, and which accordingly is then susceptible of low prices of sale to the consuming public, thereby making such a scale with use reminder and weight change messages economically available to the buying public.

Even still another object of the present invention is to provide a new and improved scale with use reminder and weight change messages for reminding a user to weigh themselves daily at a predetermined time and offer congratulatory comments upon weight loss and offer encouragement upon weight gain.

Lastly, it is an object of the present invention to provide a new and improved scale with use reminder and weight change messages including a scale portion capable of accurately determining a weight of a person standing thereon. The scale portion includes a display for registering the weight of the person standing thereon. A central processing unit is disposed interiorly of the scale portion. The central processing unit is capable of storing the weight of the person standing on the scale portion on a first day and comparing it with the weight of the person standing on the scale portion on a next day and illustrating both on the display along with a difference between the two. The central processing unit includes programmed messages.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
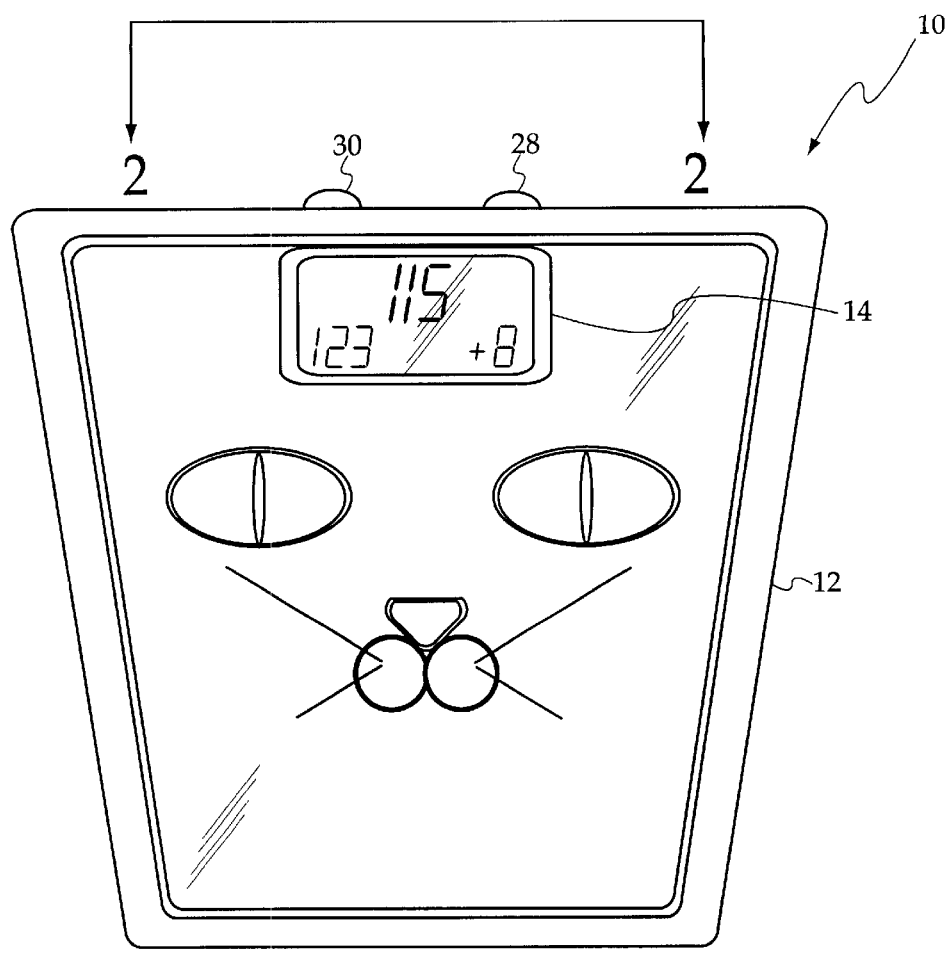
FIG. 1 is a perspective view of the preferred embodiment of the scale with use reminder and weight change messages constructed in accordance with the principles of the present invention.
Figure 2:
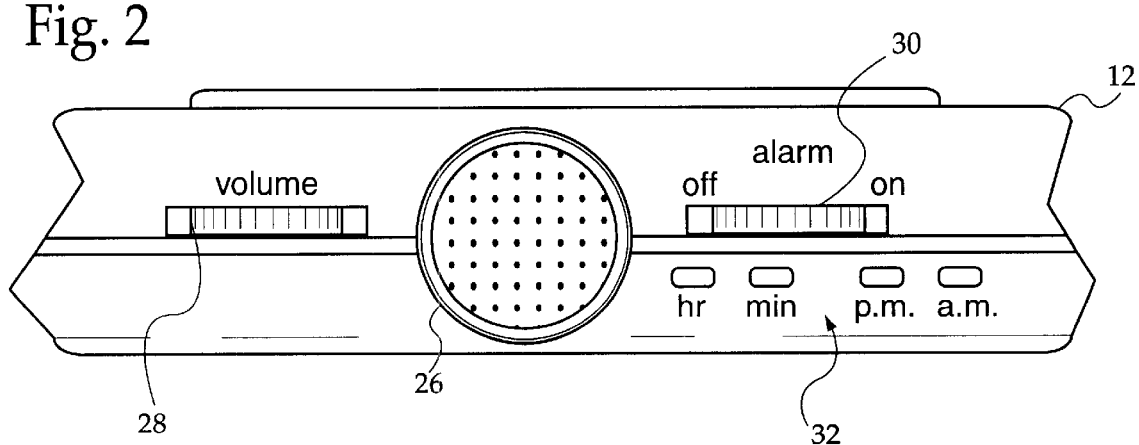
FIG. 2 is a side view of the present invention as taken along line 2—2 of FIG. 1.
Figure 3:
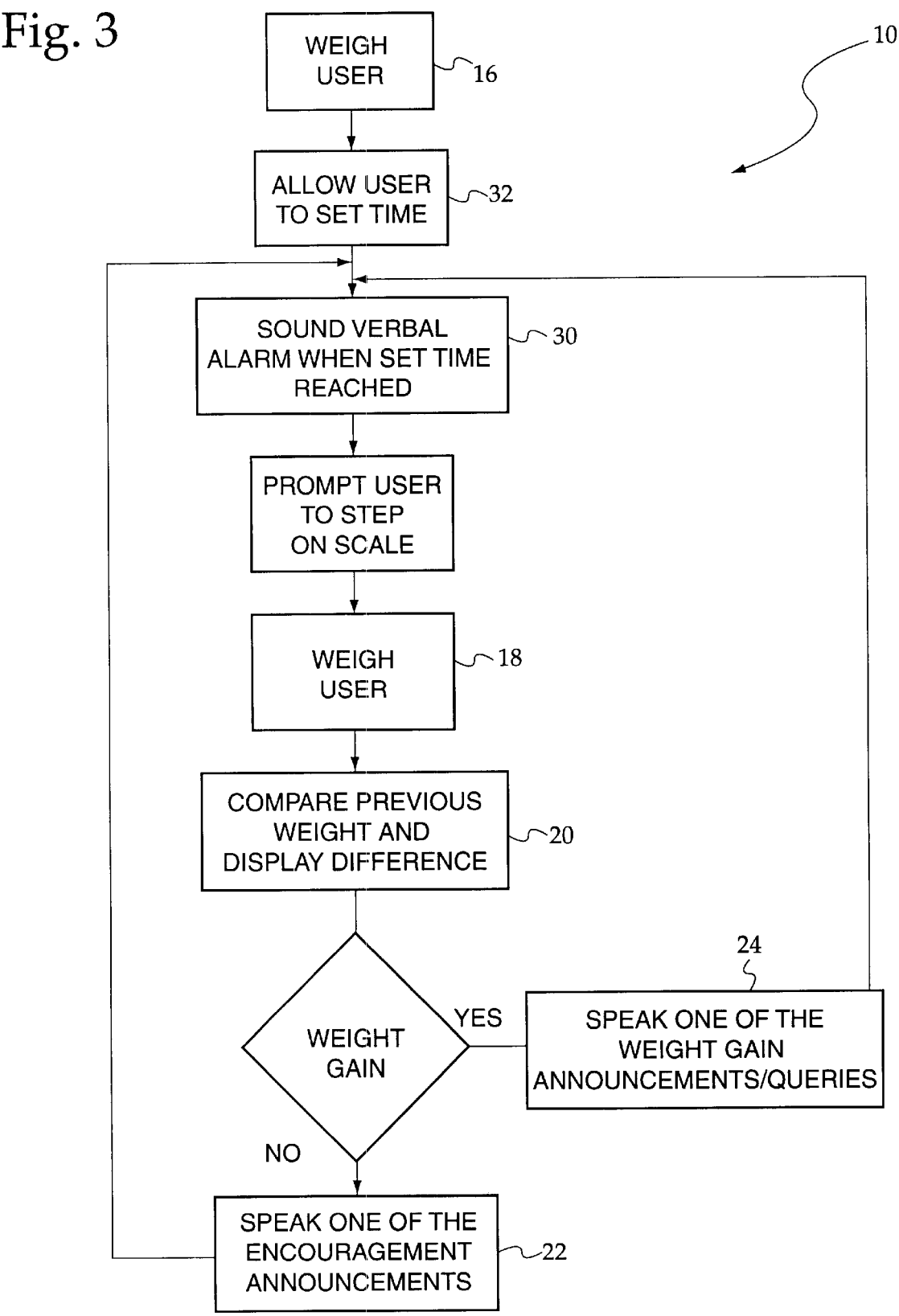
FIG. 3 is a schematic illustration of the operability of the present invention.

With reference now to the drawings, and in particular, to FIGS. 1 through 3 thereof, the preferred embodiment of the new and improved scale with use reminder and weight change messages embodying the principles and concepts of the present invention and generally designated by the reference number 10 will be described.

Specifically, it will be noted in the various Figures that the device relates to a scale with use reminder and weight change messages for reminding a user to weigh themselves daily at a predetermined time and offer congratulatory comments upon weight loss and offer encouragement upon weight gain. In its broadest context, the device consists of a scale portion, a central processing unit, and a programmable alarm. Such components are individually configured and correlated with respect to each other so as to attain the desired objective.

The scale portion 12 is capable of accurately determining a weight of a person standing thereon. The scale portion 12 includes a display 14 for registering the weight of the person standing thereon. Note FIG. 1. The scale portion 12 could also include a decorative design on an upper surface thereof to enhance the appearance of the present invention.

The central processing unit is disposed interiorly of the scale portion 12. The central processing unit is capable of storing the weight of the person standing on the scale portion on a first day 16 and comparing it with the weight of the person standing on the scale portion on a next day 18 and illustrating both on the display 14 along with a difference 20 between the two. The central processing unit includes programmed messages. The programmed messages include congratulatory messages 22 when the weight of the person on the next day 18 is less than the weight of the person of the first day 16 and encouraging messages 24 when the weight of the person on the next day 18 is greater than the weight of the person of the first day 16. The encouraging messages 24 could also include questions that will prompt the person to think about what they ate the day before or whether they neglected to exercise. The central processing unit includes a speaker 26 for broadcasting the programmed messages. The speaker 26 includes a volume control dial 28.

The programmable alarm 30 is disposed within the scale portion 12. The programmable alarm 30 has a time-activated alarm in communication with the speaker 26 of the central processing unit. The programmable alarm 30 includes a control panel 32 to input a desired time for the time-activated alarm to be activated. Thus, a person can set the alarm 30 for the time each day that when they wish to weigh themselves.

In use, a person will step on the scale portion 12 on a first day and their weight will be recorded via the central processing unit. The next day, after hearing the alarm 30, the person will step on the scale portion 12 again. The display 14 will show the current weight and compare it to the weight of the prior day and display the difference, if any. If the weight is greater, the encouragement messages and questions 24 will be played to make the person think about the prior days eating and activities. If the weight is less, the congratulatory messages 22 will be played encouraging the person to keep up the good work.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A scale with use reminder and weight change messages for reminding a user to weigh themselves daily at a predetermined time and offer congratulatory comments upon weight loss and offer encouragement upon weight gain comprising, in combination:

a scale portion capable of accurately determining a weight of a person standing thereon, the scale portion including a display for registering the weight of the person standing thereon;

a central processing unit disposed interiorly of the scale portion, the central processing unit being capable of storing the weight of the person standing on the scale portion on a first day and comparing it with the weight of the person standing on the scale portion on a next day and illustrating both on the display along with a difference between the two, the central processing unit including programmed messages, the programmed messages including congratulatory messages when the weight of the person on the next day is less than the weight of the person of the first day and encouraging messages when the weight of the person on the next day is greater than the weight of the person of the first day, the central processing unit including a speaker for broadcasting the programmed messages, the speaker including a volume control dial; and a programmable alarm disposed within the scale portion, the programmable alarm having a time-activated alarm in communication with the speaker of the central processing unit, the programmable alarm including a control panel to input a desired time for the time-activated alarm to be activated.

2. A scale with use reminder and weight change messages for reminding a user to weigh themselves daily at a predetermined time and offer congratulatory comments upon weight loss and offer encouragement upon weight gain comprising, in combination:

a scale portion capable of accurately determining a weight of a person standing thereon, the scale portion including a display for registering the weight of the person standing thereon; and a central processing unit disposed interiorly of the scale portion, the central processing unit being capable of storing the weight of the person standing on the scale portion on a first day and comparing it with the weight of the person standing on the scale portion on a next day and illustrating both on the display along with a difference between the two, the central processing unit including programmed messages; and a programmable alarm disposed within the scale portion, the alarm having a control panel to input a desired time for the time-activated alarm to be activated.

3. The scale with use reminder and weight change messages as set forth in claim 2, wherein the central processing unit includes programmed messages.

4. The scale with use reminder and weight change messages as set forth in claim 3, wherein the programmed messages include congratulatory messages when the weight of the person on the next day is less than the weight of the person of the first day and encouraging messages when the weight of the person on the next day is greater than the weight of the person of the first day.

5. The scale with use reminder and weight change messages as set forth in claim 3, wherein the central processing unit includes a speaker for broadcasting the programmed messages.

* * * * *